United States Patent [19]

Sato et al.

[11] Patent Number: 4,733,317
[45] Date of Patent: Mar. 22, 1988

[54] MAGNETIC TAPE CASSETTE HAVING A TAPE PASSAGE INCLUDING RIBS

[75] Inventors: Takateru Sato, Saku; Haruo Shiba, Komoro, both of Japan

[73] Assignee: TDK Corporation, Tokyo, Japan

[21] Appl. No.: 790,088

[22] Filed: Oct. 22, 1985

[30] Foreign Application Priority Data

Dec. 6, 1984 [JP] Japan .......................... 59-185126[U]

[51] Int. Cl.⁴ ...................... G11B 15/52; G11B 23/02
[52] U.S. Cl. ....................................... 360/132; 360/60; 360/74.6; 242/199
[58] Field of Search .......... 360/132, 60, 74.6, 130.21; 242/199, 188, 197

[56] References Cited

U.S. PATENT DOCUMENTS

| | | | |
|---|---|---|---|
| 3,615,155 | 10/1971 | Gelbman | 360/132 |
| 3,764,088 | 10/1973 | Yamada et al. | 242/188 |
| 3,826,447 | 7/1974 | Yabu et al. | 242/188 |
| 3,861,622 | 1/1975 | Wakami et al. | 242/188 |
| 4,162,774 | 7/1979 | Bowers | 242/199 |
| 4,231,532 | 11/1980 | Popov et al. | 360/132 |
| 4,307,427 | 12/1981 | Kawachi | 360/130.21 |
| 4,343,024 | 8/1982 | Kawai | 360/132 |
| 4,380,032 | 4/1983 | Pfost | 360/132 |
| 4,646,186 | 2/1987 | Tsuchiya et al. | 360/105 |

Primary Examiner—Stuart N. Hecker
Assistant Examiner—Alfonso Garcia
Attorney, Agent, or Firm—Oblon, Fisher, Spivak, McClelland & Maier

[57] ABSTRACT

A magnetic tape cassette is provided with a detection hold laterally extending between two cylindrical holes extending from the upper surface of the upper half casing and the lower surface of the lower half casing in which ribs are formed in the detection hole to restrict vertical movement of a magnetic tape running between the two cylindrical holes.

3 Claims, 7 Drawing Figures

MAGNETIC TAPE CASSETTE HAVING A TAPE PASSAGE INCLUDING RIBS

BACKGROUND OF THE INVENTION

1. Field of the Invention:

The present invention relates to a magnetic tape cassette used for recording digital signals.

2. Description of the Related Art:

Magnetic tape cassettes have been developed to use them mainly for recording analogue signals. On the other hand, floppy disks have mainly been used for recording digital signals. Floppy disks, however, have problems of fingerprints impressed on a disk through an opening such as an insertion window for a magnetic head and drop-out due to invasion of a foreign substance such as dust. Further, the floppy disks have to be carefully handled owing to high flexibility.

In view of the above-mentioned problems, employment of magnetic tape cassettes for recording digital signals as shown in FIG. 5 as been studied. In the FIG., reference numerals 1 and 2 respectively designate upper and lower half casings having top and bottom walls 20 and 22, and being formed of a suitable synthetic resinous material which may be assembled to constitute a single casing body. A magnetic tape 3 and reels 4, 5 around which the magnetic tape 3 is wound are held in the upper and lower casings 1, 2. The reels are rotatable about axes extending in a first direction normal to the top and bottom walls. The magnetic tape 3 wound around the reels 4, 5 is introduced in the front surface of the half casings 1, 2 under the condition that the magnetic tape 3 is continuously brought into contact with a guide roller 6, a tape pad 7 and a guide roller 8 while travelling with its width $d_1$ extending in the first direction. Guide rollers 6 and 8 comprise means for guiding the tape such that its width extends normal to the top and bottom walls of the cassette. Magnetically recording and reproducing operations are carried out in the front surface area of the upper and lower half casings 1, 2.

A guard panel 9 is turnably fitted to the upper and lower half casings 1, 2 to protect the magnetic tape 3 when it is exposed at the front surface of the upper and lower half casings 1, 2. The density of recorded data in the case of recording digital signals is remarkably large in comparison with the case or recording analogue signals. Accordingly, it is necessary to use the guard panel 9 so that a fingerprint marked by impressing fingers does not remain on the magnetic tape 3. The guard panel 9 is provided with pins 93, 94 projecting inwardly from arms 91, 92 formed at the both ends. The guard panel 9 is then, turnably held by the casings 1, 2 by pivotting the pins 93, 94, to side surfaces formed at both front side portions of the casings 1, 2 in a freely turnable manner.

In non-use of the magnetic tape cassette, the guard panel 9 is brought to a position of closing the front surface of the half casings 1, 2 to protect an area where the magnetic tape runs in a stretching state as shown in FIG. 4. Accordingly, the magnetic tape 3 is prevented from touching of fingers and so on and drop-out of a magnetic layer caused by the fingerprint can be prevented. When the magnetic tape cassette is to be used, the guard panel 9 is turned above the upper half casing 1 or below the lower half casing 2 as shown in FIG. 5.

The casing formed by assembling the upper and lower half casings 1, 2 is provided with two through holes 10, 11 between which a passage for the magnetic tape 3 is formed. The through holes 10, 11 are to detect that the magnetic tape 3 has been fully wound around either the reel 4 or the reel 5. In more specifically, as shown in enlarged views by FIGS. 6 and 7, each of the upper and lower half casings 1, 2 is provided with two cylindrical portions 101, 111 each projecting inwardly and opened at the upper surface or the lower surface of the half casings 1, 2. When the upper and lower half casings are assembled, the inner diameter portions of the cylindrical portions 101, 111 form the two through holes 10, 11. In each inner end portion of the cylindrical portions 101, 111 of the upper and lower half casings 1, 2, there is formed a semi-circular recess with a slot at its intermediate portion. The semi-circular recesses provide openings 102, 112 for a magnetic-tape detection hole which laterally pass through between the through holes 10 and 11 when the upper and lower half casings are assembled. The slot formed in each semi-circular recess provides a passage for permitting the running of the magnetic tape when the half casings are assembled.

Detection of the magnetic tape 3 is carried out as follows. When a magnetic tape cassette is mounted on a tape deck, a light emitting element P and a light sensitive element Q provided at the tape deck side are respectively inserted in the through holes 10, 11. When the magnetic tape 3 is not fully wound around either reel, light from the light emitting element P is interrupted by the magnetic tape 3 since a magnetic recording layer having low light transmitting property is interposed between the light emitting element P and the light sensitive element Q. When winding of the magnetic tape 3 is nearly finished and a reader tape constituting a tape end is passed in the area of the magnetic-tape detection hole, light from the light temitting element P is received in the light sensitive element Q by transmitting the reader tape through the openings 102, 112 of the magnetic-tape detection hole, whereby completion of winding operation of the magnetic tape 3 is detected.

In FIG. 4, reference numerals 12, 13 designate holes for a capstan and a pinch roller and a numeral 14 designates a shielding plate.

In the conventional magnetic tape cassette of this kind, there is a standard for the width $d_1$ of the magnetic tape 3 and for the inner diameters $d_2$ of the openings 102, 112 of the magnetic-tape detection hole. Difference in dimensions between the width $d_1$ and the diameters $d_2$ is extremely small. Specifically, the width $d_1$ of the magnetic tape 3 is standardized to be 3.81 mm, whereas the inner diameters $d_2$ of the openings 102, 112 are standardized to be 3 mm. Accordingly, when the magnetic tape 3 running in the half casings 1, 2 is slightly shifted in the vertical direction, light from the light emitting element P reaches the light sensitive element Q even though winding operation of the magnetic tape 3 is not finished, whereby a signal indicative of completion of the winding operation is output. For example, under condition of the above-mentioned standard, light from the light emitting element P is received by the light sensitive element Q even when the magnetic tape 3 is shifted by 0.5 mm in the vertical direction to thereby generating an erroneous tape-end detection signal.

SUMMARY OF THE INVENTION

It is an object of the present invention to provide a magnetic tape cassette which eliminates generation of an erroneous tape-end detection signal by reducing vertical movement of a magnetic tape.

The foregoing and the other objects of the present invention have been attained by providing a magnetic tape cassette comprising a casing body having top and bottom walls, at least one magnetic tape reel mounted in said casing body for rotation about an axis extending in a first direction normal to said top and bottom walls, a magnetic tape in said casing, a portion of said magnetic tape being wound around said reel, means for guiding said tape in said reel such that a width of said tape extends in said first direction, first hollow cylindrical means passing through said casing body to define a first through hole on one side of said tape guided in said cassette, second hollow cylindrical means passing through said casing body to define a second through hole on another side of said tape guided in said cassette, said first and second cylindrical means together defining a passage through which said tape means, a circular detection hole in each of said cylindrical means, said detection holes facing one another, and ribs formed in said passage at positions spaced from one another in said first direction by a distance greater than said tape width, whereby said ribs comprise means for restricting movement of said tape in said first direction within said passage.

DETAILED DESCRIPTION OF THE PREFERRED EMBODIMENTS

Figure 1:
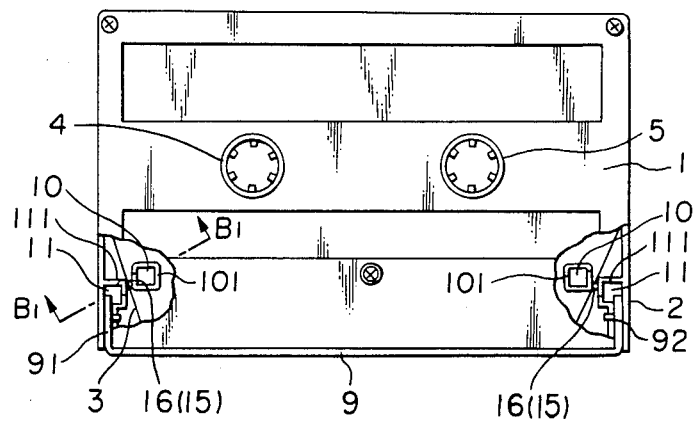
FIG. 1 is a front view partly broken of an embodiment of the magnetic tape cassette according to the present invention.
Figure 2:
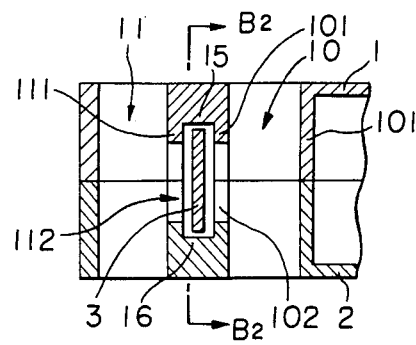
FIG. 2 is an enlarged cross-sectional view taken along a line $B_1$—$B_1$ in FIG. 1.
Figure 3:
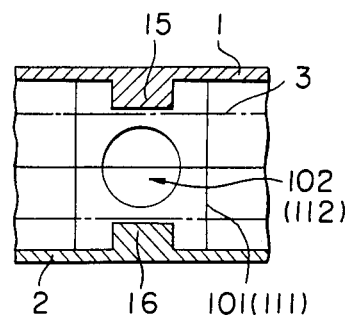
FIG. 3 is an enlarged cross-sectional view taken along a line $B_2$—$B_2$ in FIG. 2.
Figure 4:
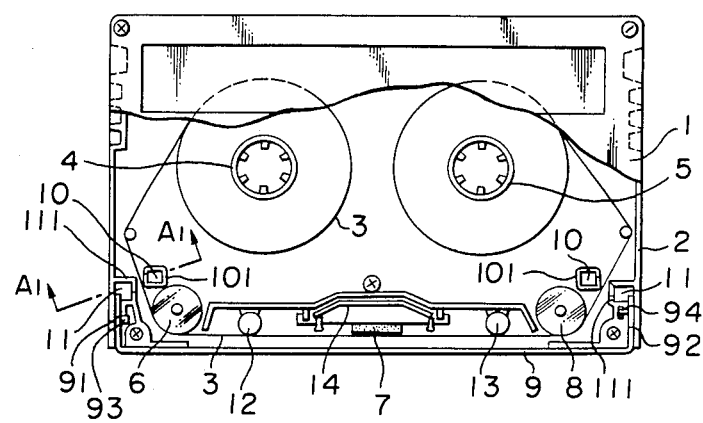
FIG. 4 is a front view partly broken of a conventional magnetic tape cassette for recording digital signals.
Figure 5:
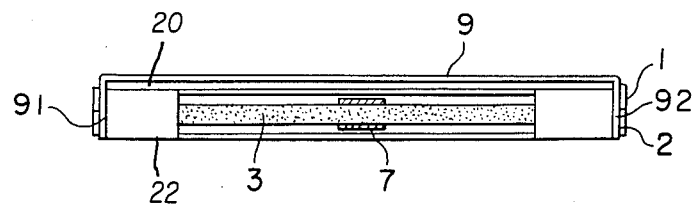
FIG. 5 is a plan view showing a magnetic tape running in the tape cassette.
Figure 6:
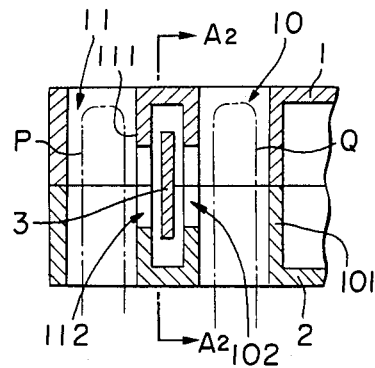
FIG. 6 is an enlarged cross-sectional view taken along a line $A_1$—$A_1$ in FIG. 4.
Figure 7:
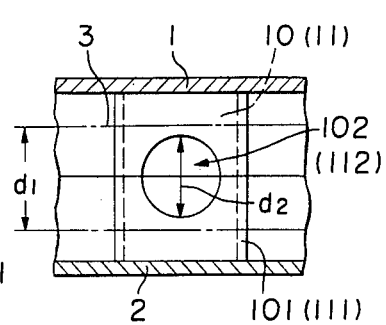
FIG. 7 is an enlarged cross-sectional view taken along a line $A_2$—$A_2$ in FIG. 6.

An embodiment of the present invention will be described with reference to FIGS. 1 to 3 in which the same reference numerals as in FIGS. 4 and 5 designate the same parts.

A casing assembly according to the embodiment of the present invention is provided with two through holes 10, 11 at both front sides of the casing and the through holes 10, 11 are formed by assembling the upper and lower half casings 1 and 2, each having cylindrical portions 101, 111 as similar to the conventional magnetic tape cassette. Between the two through holes 10, 11, there is formed a passage for the magnetic tape 3 running in the magnetic tape cassette. The passage is formed by a channel or a slot formed between an opening 101 of the through hole 10 and an opening 111 of the through hole 11. The opening 101, 111 and the slot is formed by assembling the upper and lower half casings each having a semi-circular recess and a channel or a slot at the intermediate of the recess. Ribs 15, 16 extend towards one another from the walls of the half casings 1 and 2, and are respectively formed in the slot at positions opposing to each other in the first direction when the upper and lower half casings are assembled, and provide means for restricting movement of the tape in the first direction, whereby vertical movement of the magnetic tape 3 running in the magnetic tape cassette is restricted. The height of each of the ribs 15, 16 is selected so as not to hinder the running of the magnetic tape. Preferably, the spacing of the ribs is determined to be less than 0.5 mm greater than $d_1$.

With provision of the ribs 15, 16, when the magnetic tape 3 runs in the magnetic tape cassette, vertical movement of the tape 3 in the slot is restricted. Accordingly, there occurs no erroneous detection signal between a light emitting element and a light sensitive element.

I claim:

1. A magnetic tape cassette comprising:
   a casing body having top and bottom walls;
   at least one magnetic tape reel mounted in said casing body for rotation about an axis extending in a first direction normal to said top and bottom walls;
   a magnetic tape in said casing, a portion of said magnetic tape being wound around said at least one reel;
   means for guiding said tape in said reel such that a width of said tape extends in said first direction;
   first hollow cylindrical means passing through said casing body at one side of said tape guided in said cassette;
   second hollow cylindrical means passing through said casing body at another side of said tape guided in said cassettte, said first and second cylindrical means together defining a passage therebetween through which said tape passes;
   a circular hole in each of said first and second cylindrical means, said holes facing one another; and
   ribs formed within said passage at opposing positions spaced from one another in said first direction by a distance greater than said tape width, said ribs comprising means for restricting movement of said tape in said first direction within said passage wherein said ribs are spaced from one another by not more than said tape width plus 0.5 mm, whereby detection errors are minimized.

2. A magnetic tape cassette according to claim 1, wherein said distance spacing said ribs is sufficient to permit the running of said magnetic tape.

3. The cassette of claim 1 wherein said ribs extend toward one another from said top and bottom walls and have a spacing less than that of said walls, said ribs comprising means for restricting said movement of said tape in said first direction within said passage to said spacing between said ribs.

* * * * *